(12) United States Patent
Koyama et al.

(10) Patent No.: US 11,211,858 B2
(45) Date of Patent: Dec. 28, 2021

(54) LINEAR MOTOR AND COMPRESSOR

(71) Applicants: Hitachi Automotive Systems, Ltd., Hitachinaka (JP); Hitachi Industrial Equipment Systems Co., Ltd., Tokyo (JP)

(72) Inventors: Masaki Koyama, Tokyo (JP); Shuhei Nagata, Tokyo (JP); Naoyuki Oohata, Tokyo (JP); Kan Kobayashi, Hitachinaka (JP); Yoshinori Kawai, Hitachinaka (JP)

(73) Assignees: HITACHI ASTEMO, LTD., Hitachinaka (JP); HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 246 days.

(21) Appl. No.: 16/476,340

(22) PCT Filed: Oct. 25, 2017

(86) PCT No.: PCT/JP2017/038463
§ 371 (c)(1),
(2) Date: Jul. 8, 2019

(87) PCT Pub. No.: WO2018/131255
PCT Pub. Date: Jul. 19, 2018

(65) Prior Publication Data
US 2019/0356207 A1 Nov. 21, 2019

(30) Foreign Application Priority Data
Jan. 13, 2017 (JP) .............................. JP2017-003852

(51) Int. Cl.
*H02K 33/06* (2006.01)
*H02K 41/02* (2006.01)
(Continued)

(52) U.S. Cl.
CPC ............. *H02K 33/06* (2013.01); *F04B 35/04* (2013.01); *H02K 33/02* (2013.01); *H02K 41/031* (2013.01)

(58) Field of Classification Search
CPC .... H02K 41/031; H02K 41/02; H02K 41/033; H02K 33/00; H02K 33/02; H02K 33/06;
(Continued)

(56) References Cited

U.S. PATENT DOCUMENTS

2001/0043870 A1\* 11/2001 Song ..................... F04B 35/045
417/363
2007/0145832 A1\* 6/2007 Shimizu ................. H02K 33/06
310/15

(Continued)

FOREIGN PATENT DOCUMENTS

JP 2013-516567 A 5/2013
WO WO-2015/177883 A1 11/2015
(Continued)

OTHER PUBLICATIONS

International Search Report with English translation and Written Opinion issued in corresponding application No. PCT/JP2017/038463 dated Jan. 16, 2018.

*Primary Examiner* — Quyen P Leung
*Assistant Examiner* — Alexander Moraza
(74) *Attorney, Agent, or Firm* — Foley & Lardner LLP

(57) ABSTRACT

An object of the present invention is to provide a linear motor and a compressor which are effective against a non-fixed structure in which end portions of a resonant spring are not fixed and are capable of restraining loads in an up-down direction and a left-right direction which act on a slider. A linear motor includes a slider (2) which is driven in a first direction, a resonance spring (400) which is capable of vibrating in the first direction, and a permanent magnet (210) which is provided at the slider (2) and is magnetized
(Continued)

in a second direction perpendicular to the first direction. The linear motor includes a bearing (480) that is movable against both forces of a force in the second direction and a force in a third direction perpendicular to the first direction and the second direction, and an elastic-body support member (450) which connects the resonant spring (400) and the bearing (480) to each other.

5 Claims, 13 Drawing Sheets

(51) Int. Cl.
    *F04B 35/04*     (2006.01)
    *H02K 41/03*     (2006.01)
    *H02K 33/02*     (2006.01)

(58) Field of Classification Search
    CPC ........ H02K 33/12; H02K 33/16; F04B 35/04; F04B 35/045
    USPC .............................................. 310/12, 15, 25
    See application file for complete search history.

(56) References Cited

U.S. PATENT DOCUMENTS

| | | | | |
|---|---|---|---|---|
| 2011/0248579 | A1* | 10/2011 | Aoyama | H02K 41/031 310/12.25 |
| 2013/0121855 | A1* | 5/2013 | Lilie | F04B 9/06 417/363 |
| 2014/0077628 | A1* | 3/2014 | Yamada | B06B 1/045 310/12.16 |
| 2016/0094115 | A1* | 3/2016 | Okawa | H02K 33/16 310/25 |

FOREIGN PATENT DOCUMENTS

| | | |
|---|---|---|
| WO | WO-2016/163446 A1 | 10/2016 |
| WO | WO-2017/006744 A1 | 1/2017 |

\* cited by examiner

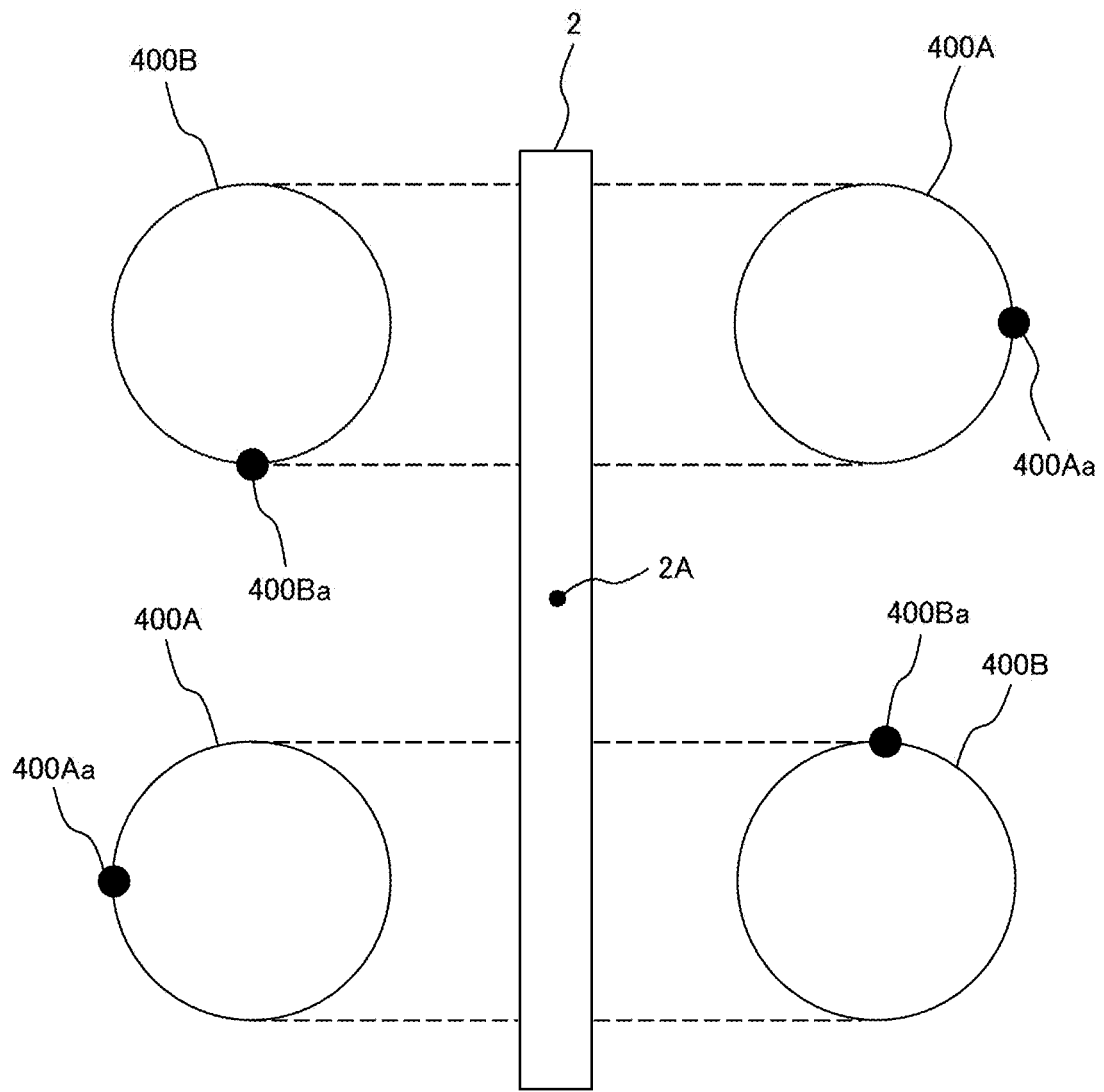

LINEAR MOTOR AND COMPRESSOR

TECHNICAL FIELD

The present invention relates to a linear motor and a compressor including a linear motor.

BACKGROUND ART

A motor used in a compressor including a linear motor has a shape in which a rotary machine is cut into a straight line, and is driven by combining the linear motor which generates thrust in a slider by a magnetic force acting between a stator and a magnetic pole provided at each rotator and a resonant spring.

JP 2013-516567 A (PTL 1) discloses a structure including the resonant spring at one end of the slider in order to cause the linear motor to drive in reciprocating motion without loss of inertial energy of the slider, as a linear motor compressor driven by combining the linear motor and the resonant spring. Specifically, the linear motor compressor of PTL 1 includes a block that defines a cylinder, a movable assembly that includes a piston which reciprocates within the cylinder, actuating means, and a rod which couples the piston to the actuating means, and a resonant spring which is arranged in a radial direction and includes a first end portion attached to the movable assembly in a coaxial manner by using first fixing means and a second end portion attached to the block by using second fixing means. The second fixing means is fixed to the block and the second end portion of the resonant spring through adjustable relative positioning. The second fixing means fixes the second end portion to the block in a position defined along a displacement of the resonant spring in relation to the block in three directions which are perpendicular to each other and are defined by a direction of an axis of the resonant spring, a radial direction of the second end portion, and a radial direction perpendicular to the two first directions, and also along an angular displacement of the second end portion of the resonant spring around the three directions perpendicular to each other (see claim 1 and FIG. 4).

CITATION LIST

Patent Literature

PTL 1: JP 2013-516567 A

SUMMARY OF INVENTION

Technical Problem

Since the linear motor compressor of PTL 1 is driven by a resonant frequency of the resonant spring, a load in a lateral direction which acts on the resonant spring acts on the movable assembly (hereinafter, referred to as the slider) including the piston, the rod, and the actuating means. Friction is caused in a support member which supports the slider due to this load, and loss caused by the friction is generated. Thus, efficiency of the linear motor is reduced.

In the linear motor compressor of PTL 1, the resonant spring and the slider are fixed by the fixing means capable of performing the relative positioning, and thus, a magnet is positioned at the motor at a correct angle by using a piston axis as a center. Accordingly, the generation of the friction is reduced. However, this method is effective in a method of fixing the end portions of the resonant spring, but is not used in a method of supporting the end portions thereof by end surfaces of the spring.

Hereinafter, a driving motor of a slider (a vibration direction caused by resonance) is referred to as a forward-backward direction, a magnetization direction of a permanent magnet of the slider (a direction perpendicular to plate surfaces of the slider) is referred to as an up-down direction, and a direction perpendicular to the forward-backward direction and the up-down direction is referred to as a left-right direction (lateral direction).

An object of the present invention is to provide a linear motor and a compressor which are effective against a non-fixed structure in which end portions of a resonant spring are not fixed and are capable of restraining loads in an up-down direction and a left-right direction which act on a slider.

Solution to Problem

In order to achieve the object, there is provided a linear motor that includes a slider driven in a first direction, resonant springs capable of vibrating in the first direction, and a permanent magnet which is provided at the slider and is magnetized in a second direction perpendicular to the first direction. The linear motor includes a bearing that is movable against both forces of a force in the second direction and a force in a third direction perpendicular to the first direction and the second direction, and an elastic-body support member that connects the resonant spring and the bearing to each other.

Advantageous Effects of Invention

According to the present invention, it is possible to provide a linear motor and a compressor which are effective against a non-fixed structure in which end portions of a resonant spring are not fixed and are capable of restraining loads in an up-down direction and a left-right direction which act on a slider. Other objects, configurations, and effects will be made apparent in the following descriptions.

BRIEF DESCRIPTION OF DRAWINGS

FIG. 4D is a schematic diagram illustrating an arrangement of the resonant springs of the linear motor including the resonant springs according to Embodiment 1.

DESCRIPTION OF EMBODIMENTS

Hereinafter, embodiments of the present invention will be described in detail with reference to the accompanying drawings. The same components in Examples 1 to 6 will be assigned the same reference signs, and thus, the redundant description thereof will not be repeated. Although terms of forward-backward, left-right, and up-down directions which are perpendicular to each other are used for the sake of convenience in description, a direction of gravity does not necessarily need to be downward, and can be parallel to a up, right, left, forward, or backward direction, or other directions.

The forward-backward direction corresponds to a driving direction of a slider 2, and corresponds to a vibration direction caused by resonance. The driving direction of the slider 2 corresponds to an axial direction of the slider 2, and corresponds to a driving direction (axial direction) of a piston 1100. The up-down direction corresponds to magnetization directions of permanent magnets 210 provided at the slider 2. The up-down direction corresponds to a direction perpendicular to magnetic pole surfaces of the permanent magnet 210, and corresponds to a direction perpendicular to a plate surface of the slider 2. A direction perpendicular to the forward-backward direction and the up-down direction is referred to as the left-right direction or a lateral direction.

The permanent magnet 210 has a magnetic pole (magnetic surface) of an N pole at one end portion (end surface) in the magnetization direction, and has a magnetic pole (magnetic surface) of an S pole at the other end portion (end surface). In the following description, the permanent magnets 210 and the magnetic poles of the permanent magnets 210 will be described as the same components. That is, the magnetic poles of the permanent magnets 210 may be described with the reference sign 210 in the following description.

Embodiment 1

Figure 1:
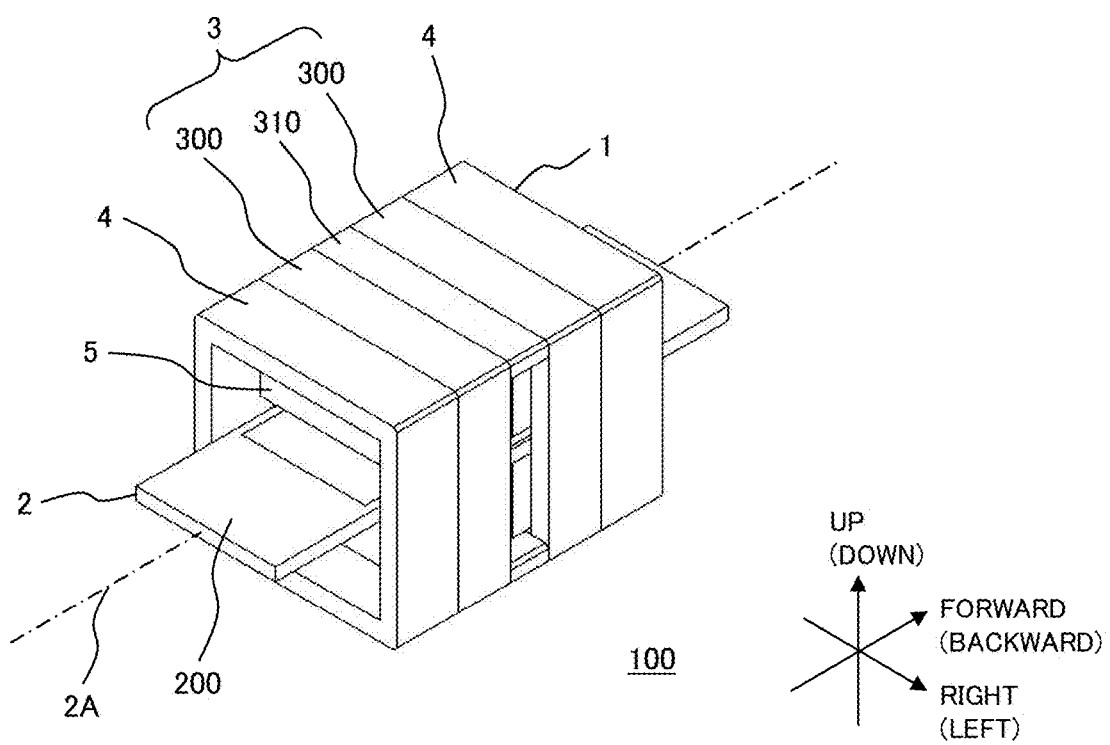
FIG. 1 is a perspective view of a linear motor according to Embodiment 1.
Figure 2A:
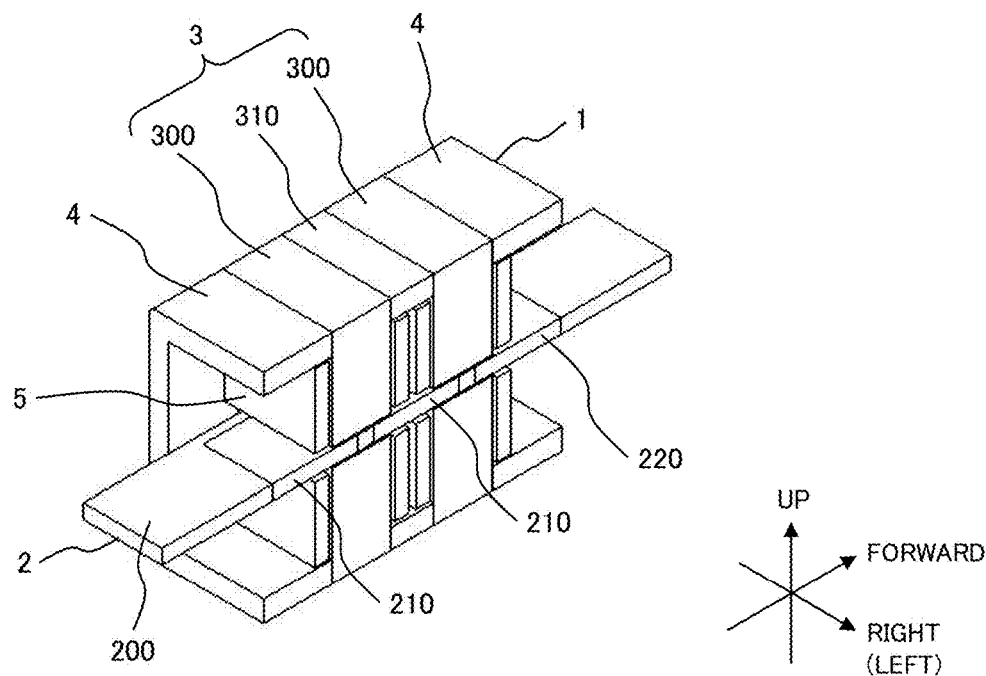
FIG. 2A is a perspective view illustrating a cross section of the linear motor according to Embodiment 1 which is perpendicular to a left-right direction.
Figure 2B:
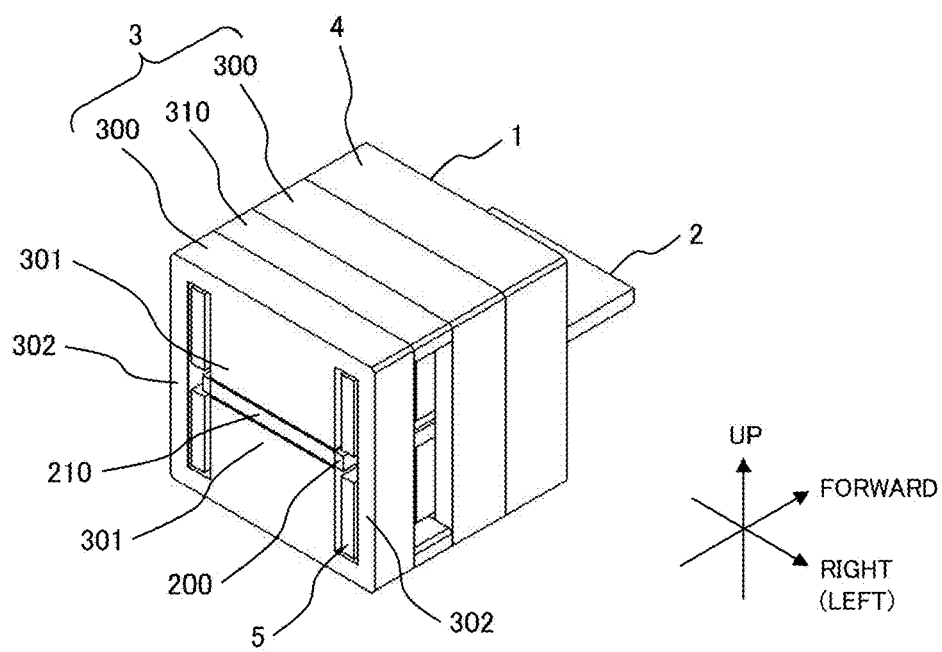
FIG. 2B is a perspective view illustrating a cross section of the linear motor according to Embodiment 1 which is perpendicular to a forward-backward direction.

FIG. 1 is a perspective view of a linear motor according to Embodiment 1. FIG. 2A is a perspective view illustrating a cross section of the linear motor according to Embodiment 1 which is perpendicular to the left-right direction. FIG. 2B is a perspective view illustrating a cross section of the linear motor according to Embodiment 1 which is perpendicular to the forward-backward direction.

A linear motor 100 includes a stator 1 and the slider 2. In the following description, although it will be described that an armature side that is stationary on the ground is described as the stator and a field magnet side that moves relative to the ground in the forward-backward direction is described as the slider, the stator and the slider may have a reverse relationship. In a case where the stator and the rotator are used in a compressor, the piston is connected to a slider side.

The stator 1 includes an armature 3, and end-portion members 4 respectively arranged on a front side and a rear side of the armature 3. The armature 3 includes cores 300 as soft magnetic bodies and a spacer 310, and the two cores 300 are connected by the spacer 310 as a soft magnetic body. Accordingly, a magnetic path including the two cores 300 and the spacer 310 can be formed. Windings 5 are respectively wound around the cores 300.

One or two or more armatures 3 can be arranged in the forward-backward direction. The end-portion members 4 can be provided on the front side of the armature 3 which is the frontmost side and/or the rear side of the armature 3 which is the backmost side.

Hereinafter, one of the forward direction and the backward direction is described as a first direction, and the other direction thereof is described as a second direction.

The core 300 includes magnetic pole teeth 301 which are arranged so as to face each other with the slider 2 interposed therebetween, to be described below, and arm portions 302 which connect these two magnetic pole teeth 301. For example, the magnetic pole teeth 301 and the arm portions 302 can be formed by laminating electrical steel sheets in the forward-backward direction. The windings 5 are wounded around the magnetic pole teeth 301.

The arm portions 302 are soft magnetic bodies which vertically pass outside the windings 5 and the slider 2 in the left-right direction, and can guide magnetic flux, which is emitted from the permanent magnet magnetic poles 210 and enters one magnetic pole tooth 301, to the other magnetic pole tooth 301 facing the one magnetic pole tooth 301. Accordingly, the core 300 can form a magnetic path including both surfaces of the permanent magnet magnetic poles 210 facing the magnetic pole teeth 301, the two magnetic pole teeth 301, and the arm portions 302.

The spacer 310 can cause the magnetic flux flowing in the adjacent core 300 to pass through. For example, the spacer 310 can be formed by laminating electrical steel sheets in the forward-backward direction. Thus, the armature 3 in which the spacer 310 is arranged between the two cores 300 can form a magnetic path including the two cores 300 and the permanent magnets 210 according to a design such as an interval between the permanent magnets 210 in the forward-backward direction.

The end-portion member 4 can be a soft magnetic body or a nonmagnetic body. The end-portion members 4, the cores 300, and the spacer 310 are fixed by a fixing member such as a through bolt (not illustrated) extending in the forward-backward direction. Support members (not illustrated) such as roller bearings are arranged at the end-portion members 4, and support the slider 2.

The slider 2 includes a magnetic-pole support portion (magnet support portion) 200 including a nonmagnetic body or a soft magnetic body which fixes three permanent magnets in the forward-backward direction, and the permanent magnets 210 provided at the magnetic-pole support portion 200. The forward-backward direction of the slider 2 is a longitudinal direction (axial direction).

Although it has been described that the slider 2 according to the present embodiment fixes the three permanent magnets (magnetic poles) 210 in the longitudinal direction, the number of permanent magnets may be four or more, or may be two. Although it has been described that two permanent magnets 210 according to the present embodiment are arranged in the forward-backward direction, one permanent magnet or three or more permanent magnets may be arranged. For example, some of a plurality of magnetic poles which is a plurality of permanent magnets 210 may be soft magnetic poles which are made of an iron material, a steel material, or an electric steel sheet.

The permanent magnets 210 are magnetized in the up-down direction. Top surfaces of the three permanent magnets 210 according to the present embodiment are arranged such that the magnetic pole of the front permanent magnet 210 is an N pole, the magnetic pole of the middle permanent magnet 210 is an S pole, and the magnetic pole of the rear permanent magnet 210 is an N pole.

The slider 2 is arranged in a space between the two magnetic pole teeth 301, to be described below, and between the two arm portions 302. The permanent magnet 210 can have a flat plate shape perpendicular to the up-down direction. Hereinafter, one of the up direction and the down direction is also described as a third direction. In the present embodiment, the up-down direction is a direction in which the magnetic pole teeth 301 and the magnetic poles (magnetic pole surfaces) of the permanent magnets 210 face each other.

For example, the magnetic-pole support portion 200 can have a ladder shape in which two, three, or four or more cavities into which the permanent magnets 210 are fitted are formed, and can fix the permanent magnets 210 by using an adhesive or the like. Recess portions to which the permanent magnets 210 can be attached may be formed instead of the cavities. The magnetic-pole support portion 200 may be a soft magnetic body or may be a nonmagnetic body.

A width of a portion of the ladder-shaped portion of the magnetic-pole support portion 200 in the forward-backward direction, which is positioned between the magnetic poles 210 in the forward-backward direction, is different from a width of the magnetic pole 210 in the forward-backward direction. In the present embodiment, the width of the ladder-shaped portion in the forward-backward direction is particularly narrower than the width of the permanent magnet 210 in the forward-backward direction.

In the present embodiment, when the magnetic pole teeth 301 are magnetized by supplying a single-phase current to the windings 5 of the armature 3 from an inverter (not illustrated), thrust is generated in the forward-backward direction due to interaction with the permanent magnets 210 of the slider 2, and thus, the slider 2 moves in the forward-backward direction.

Figure 3A:
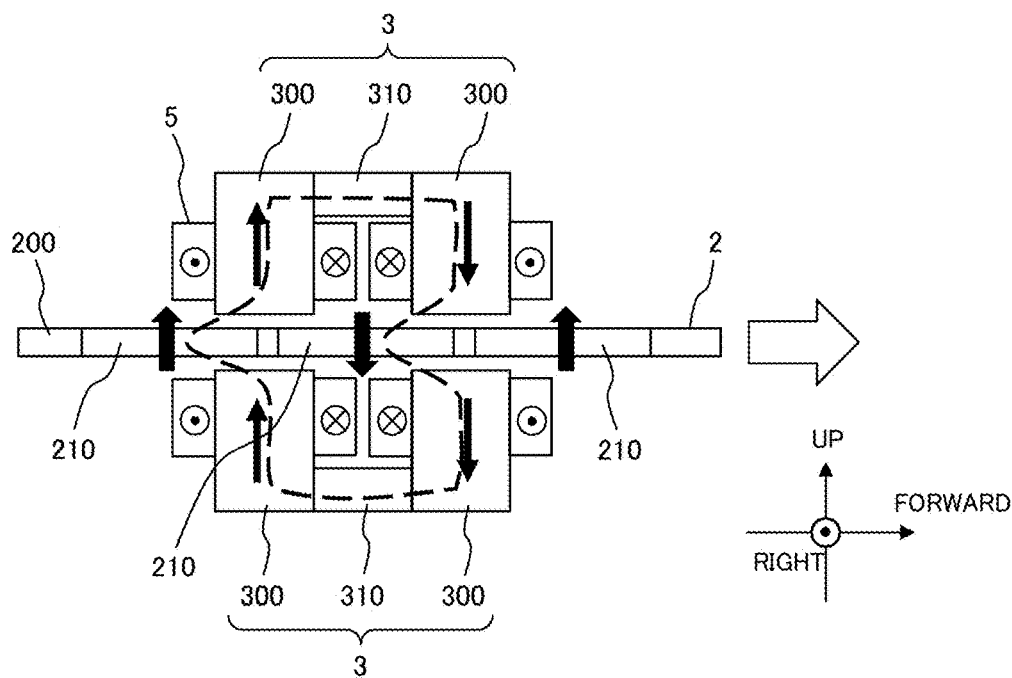
FIG. 3A is a schematic diagram of the cross section of the linear motor according to Embodiment 1 which is perpendicular to the left-right direction, and in which thrust is generated in a forward direction.
Figure 3B:
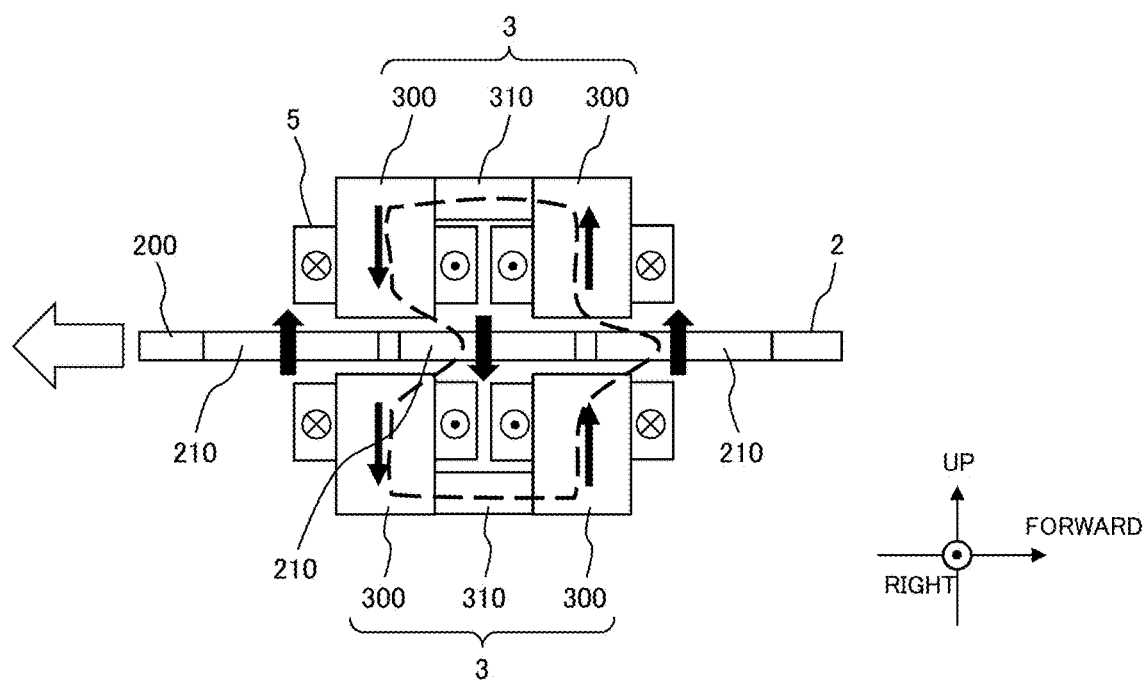
FIG. 3B is a schematic diagram of the cross section of the linear motor according to Embodiment 1 which is perpendicular to the left-right direction, and in which thrust is generated in a backward direction.

FIG. 3A is a schematic diagram of a cross section of the linear motor according to Embodiment 1 which is perpendicular to the left-right direction, and in which thrust is generated in the forward direction. FIG. 3B is a schematic diagram of a cross section of the linear motor according to Embodiment 1 which is perpendicular to the left-right direction, and in which thrust is generated in the backward direction.

A case where the thrust is received in the forward direction will be initially described. Centers of gravity of the three permanent magnets (magnetic poles) 210 are arranged at the slider 2 at substantially constant intervals, and the magnetic poles of the three permanent magnets 210 are arranged in the order of the magnetic poles of "N pole, S pole, and N pole" from the front toward the rear, as stated above. A positive current is applied to the windings 5.

Solid arrows represent the magnetization directions caused by a magnetomotive force. A main magnetic flux line within the linear motor 100 loops in the two permanent magnets 210 and the armature 3 as represented by a broken line, the two permanent magnets 210 are attracted to the armature 3, and the slider 2 receives the thrust in the forward direction as represented by a white arrow.

A negative current is applied to the windings 5 such that an orientation of the magnetic flux within the armature 3 when the thrust is received in the backward direction is opposite to an orientation of the magnetic flux when the thrust is received in the forward direction. The main magnetic flux line within the linear motor 100 loops in the permanent magnets 210 and the armature 3 as represented by the broken line, the permanent magnet magnetic poles 210 are attracted to the armature 3, and the slider 2 receives the thrust in the backward direction as represented by the white arrow.

Configurations of resonant springs 400 and elastic-body support members 450 will be described with reference to FIGS. 4A to 4E.

Figure 4A:
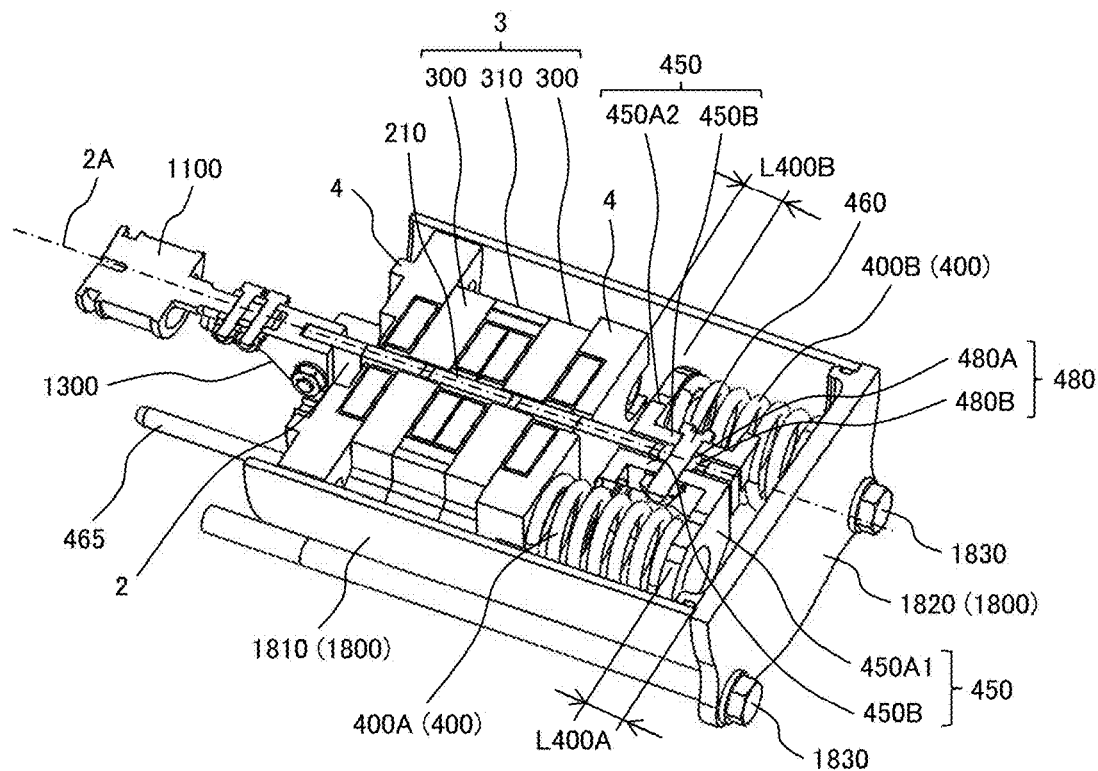
FIG. 4A is a perspective view of the linear motor including resonant springs according to Embodiment 1.

FIG. 4A is a perspective view of the linear motor including the resonant springs according to Embodiment 1.

The elastic-body support member 450 is a member that mechanically connects one side of the resonant spring 400 in the forward-backward direction to the slider 2. A plurality (in the present embodiment, four, preferably, even number) of resonant springs 400 is provided, and is arranged such that a direction in which the springs expand or contract is the forward-backward direction. The elastic-body support members 450 are attached to the slider 2 such that the elastic-body support portion 450A is positioned on any one of a front side and a rear side of each of the plurality of resonant springs 400. Front end portions of approximately half or half of the resonant springs 400 are supported by the elastic-body support portion 450A, and rear end portions of the approximately half or half of the resonant springs are supported by the elastic-body support portion 450A. In the present embodiment, the resonant springs 400 are coil springs.

Figure 4B:
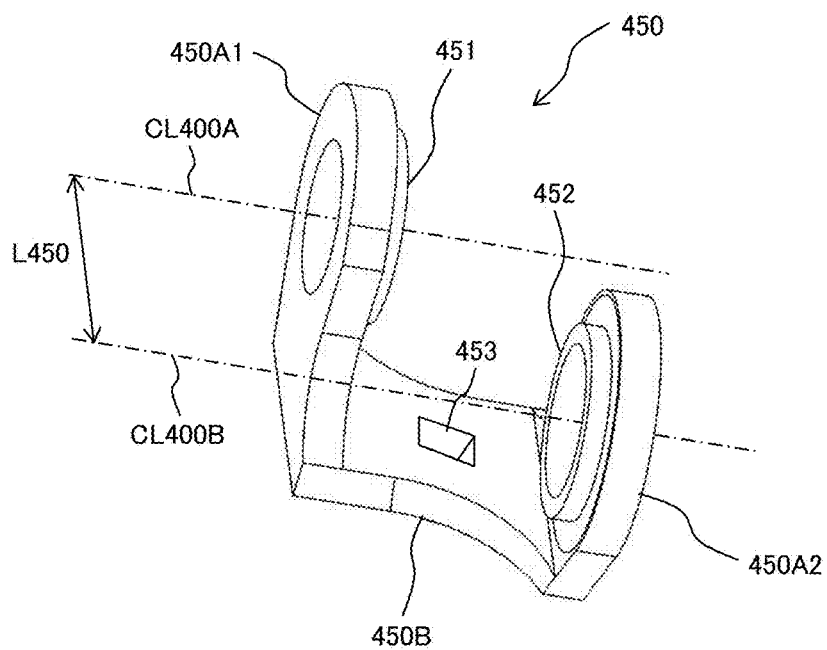
FIG. 4B is a schematic diagram of elastic-body support portions of the linear motor including the resonant springs according to Embodiment 1.
Figure 4C:
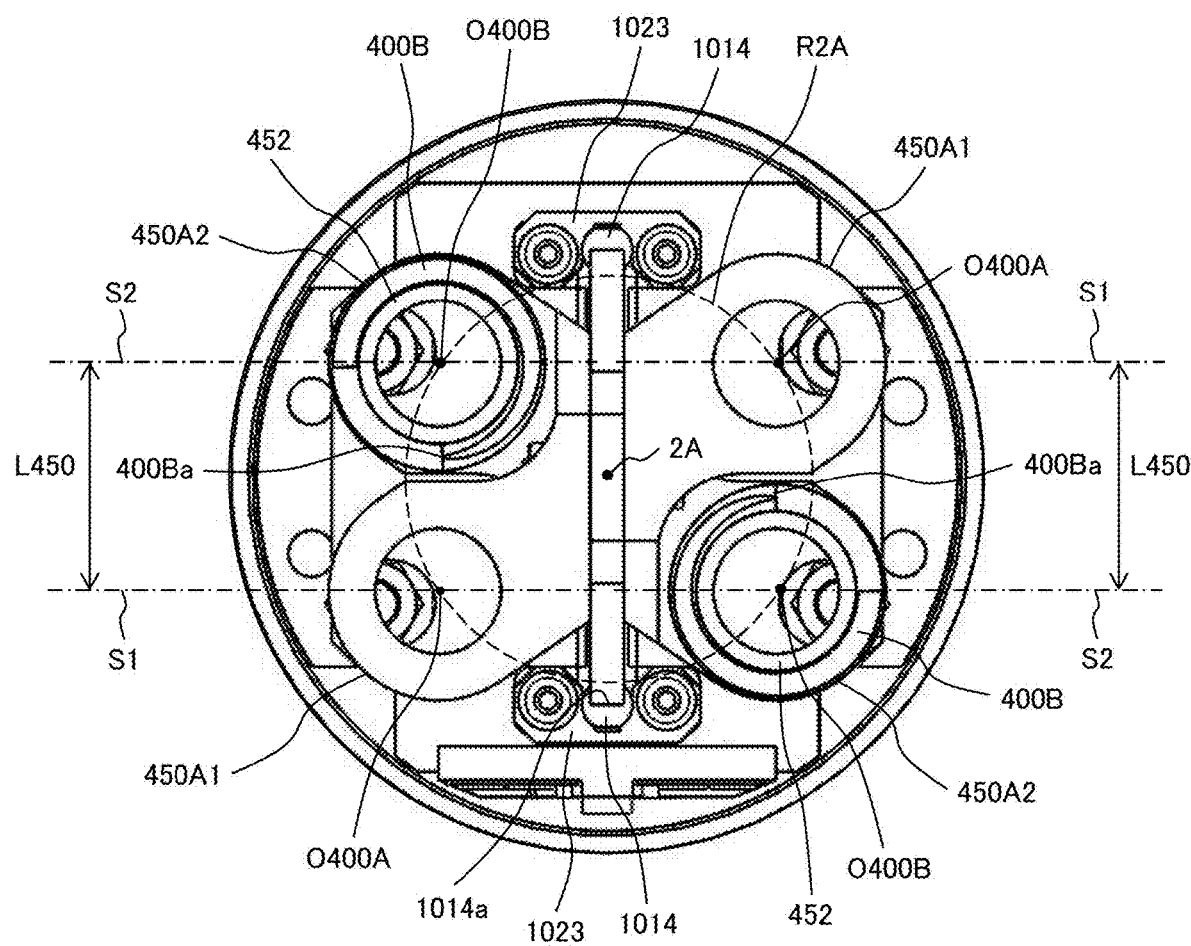
FIG. 4C is a schematic diagram of the linear motor including the resonant springs according to Embodiment 1 when viewed in the backward direction.

FIG. 4B is a schematic diagram of the elastic-body support portions of the linear motor including the resonant springs according to Embodiment 1. FIG. 4C is a schematic diagram of the linear motor including the resonant springs according to Embodiment 1 when viewed in the backward direction.

The elastic-body support member 450 is configured such that elastic-body support portions 450A1 and 450A2 which support one end of the resonant spring 400 and a fixing portion 450B which fixes the elastic-body support member 450 to a spherical bearing 480 are integrally formed. The fixing portion 450B extends in the forward-backward direction (a movement direction of the slider 2), and is fastened to a protrusion portion of the slider 2 which protrudes backwards from the end-portion member 4 through the spherical bearing 480 by using a bolt and a nut 460 each including a detent. Thus, a through-hole 453 through which a bolt passes and which has a detent portion is formed in the fixing portion 450B. The elastic-body support portion 450A1 is formed at one end portion of the fixing portion 450B in the forward-backward direction, and the elastic-body support portion 450A2 is formed at the other end portion of the fixing portion 450B in the forward-backward direction. The elastic-body support portions 450A1 and 450A2 are formed so as to project in a direction (a perpendicular direction in the present embodiment) intersecting with an extending direction (forward-backward direction) of the fixing portion 450B from both the end portions of the fixing portion 450B. In other words, the elastic-body support portions 450A1 and 450A2 are formed so as to protrude in a direction which is perpendicular to the plate surface of the slider 2 having the flat plate shape and in a direction spaced apart from the plate surfaces of the slider 2 from both the end portions of the fixing portion 450B.

The other end portion of a first resonant spring 400A (400) having a rear end portion supported by the elastic-body support portion 450A1 is supported by the end-portion member 4. The other end portion of a second resonant spring 400B (400) having a front end portion supported by the elastic-body support portion 450A2 is supported by a bottom surface 1820 of a casing 1800.

The elastic-body support portion 450A1 includes an annular protruding portion 451 to which the resonant spring 400A is fitted and which has a circular outer peripheral surface. The elastic-body support portion 450A2 includes an annular protruding portion 452 to which the resonant spring 400B is fitted and which has a circular outer peripheral surface. The protruding portion 451 constrains a position of the resonant spring 400A in a radial direction, and the protruding portion 452 constrains a position of the resonant spring 400B in the radial direction.

A position misalignment of the resonant spring 400 in the radial direction of the spring is prevented by the annular protruding portions 451 and 452 formed at the elastic-body support portions 450A1 and 450A2. However, both end portions of the resonant spring 400 are not fixedly coupled to the elastic-body support portions 450A1 and 450A2, the end-portion member 4, and the bottom surface 1820 of the casing 1800, and the resonant spring 400 is separated from the elastic-body support portions 450A1 and 450A2, the end-portion member 4, and the bottom surface 1820 of the casing 1800 when the contraction state of the resonant spring 400 is canceled. That is, the resonant spring 400 is sandwiched between the elastic-body support portion 450A1 and the end-portion member 4 or between the elastic-body support portion 450A2 and the bottom surface 1820 of the casing 1800 in the contraction state, and thus, the resonant spring is merely held between the elastic-body support portion 450A1 and the end-portion member 4 or between the elastic-body support portion 450A2 and the bottom surface 1820 of the casing 1800. Thus, a support structure of the resonant spring 400 becomes simple, and an assembly of the resonant spring 400 becomes simple.

Both the end portions of the resonant springs 400 are not fixedly coupled to the elastic-body support portions 450A1 and 450A2, the end-portion member 4, and the bottom surface 1820 of the casing 1800, and thus, it is possible to prevent or restrain a lateral load in the left-right direction or the up-down direction from acting on the slider 2 due to a shape error of the resonant spring 400 or individual differences between the plurality of resonant springs 400.

A center line CL400A which passes through a circular center O400A formed by the protruding portion 451 and a center line CL400B which passes through a circular center O400B formed by the protruding portion 452 form a space L450 in a direction along the plate surface of the slider 2. This space L450 is set so as to have a size with which the resonant spring 400A and the resonant spring 400B do not interfere with each other in a state in which the resonant spring 400A and the resonant spring 400B are assembled to the elastic-body support members 450.

The elastic-body support portion 450A1 and the fixing portion 450B of the elastic-body support member 450 have an L shape on a cross section S1 which passes through the circular center O400A formed by the protruding portion 451 and is perpendicular to the plate surface of the slider 2. The elastic-body support portion 450A2 and the fixing portion 450B of the elastic-body support member 450 have an L shape on a cross section S2 which passes through the circular center O400B formed by the protruding portion 452 and is perpendicular to the plate surface of the slider 2.

The plurality of resonant springs 400 is separately arranged on both sides of the slider 2 which protrude backwards from the armature 3. Specifically, the resonant springs 400 are separately arranged on both sides of the slider 2 with the slider 2 as a boundary in the direction perpendicular to the plate surfaces (magnetic pole surfaces) of the slider 2. In this case, at least one first resonant spring 400A and at least one second resonant spring 400B are arranged on each of both sides of the slider 2. In the present embodiment, the first resonant spring 400A and the second resonant spring 400B are arranged on one side of the slider 2 one by one. When viewed on the cross section perpendicular to the forward-backward direction, the first resonant springs 400A and the second resonant springs 400B are alternately arranged in a circumferential direction R2A using a central axis 2A of the slider 2 as a center. The central axis 2A is an axis along the forward-backward direction, and is an axis which passes through a center of the slider 2 in the up-down direction and a center thereof in the left-right direction.

In the present embodiment, the elastic-body support member 450 is configured such that the elastic-body support portion 450A1 which supports the rear end portion of the first resonant spring 400A arranged on side of the slider 2 and the elastic-body support portion 450A2 which supports the front end portion of the second resonant spring 400B arranged on the same side of the slider 2 are integrally formed. The two elastic-body support members 450 assembled to both sides of the slider 2 have the same specification and the same shape. When the elastic-body support member 450 is arranged on a right side of the slider 2 in FIG. 4C, the elastic-body support portion 450A1 of the elastic-body support member 450 arranged on a left side of the slider 2 which supports the first resonant spring 400A in FIG. 4C is used as the elastic-body support portion 450A2 which supports the second resonant spring 400B. When the elastic-body support member 450 is arranged on the right side of the slider 2 in FIG. 4C, the elastic-body support portion 450A2 of the elastic-body support member 450 arranged on the left side of the slider 2 which supports the second resonant spring 400B in FIG. 4C is used as the elastic-body support portion 450A1 which supports the first resonant spring 400A. That is, the elastic-body support portion 450A1 and the elastic-body support portion 450A2 are replaced with each other when the elastic-body support member 450 is arranged on the left side of the slider 2 and when the elastic-body support member is arranged on the right side of the slider.

In the present embodiment, the elastic-body support members 450 having the same specification and the same shape are shared between both sides of the slider 2 by changing orientations in which the elastic-body support members are attached to the slider 2. Accordingly, the resonant springs 400A and the resonant springs 400B are arranged so as to be symmetric with respect to the center (projection point of the central axis 2A) 2A when viewed in plan view of FIG. 4C. In the present embodiment, it is possible to reduce kinds of components by sharing the components. Therefore, it is possible to reduce manufacturing costs.

The elastic-body support member 450 for the first resonant spring 400A and the elastic-body support member 450 for the second resonant spring 400B which are arranged on both sides of the slider 2 are attached to the slider 2 such that positions of both end portions of the elastic-body support members in the direction along the central axis 2A are in the same position in the direction along the central axis 2A. The two elastic-body support members 450 are fastened by using a bolt inserted to the through-hole 453 and a nut which screws into the bolt, and are supported by the slider 2 through the spherical bearing 480. The two elastic-body support members 450 are fixed to a flat plate surface 480A1 (see FIG. 4E) formed on a front surface and a rear surface of a spherical shaft 480A of the spherical bearing 480 so as not to rotate, and the spherical shaft 480A is fitted to a housing 480B of the spherical bearing 480 fixed to the slider 2. Accordingly, a change of a relative position of the two elastic-body support members 450 is restrained, and thus, it is possible to achieve a stable driving mechanism of the piston 1100.

In the present embodiment, the first resonant spring 400A and the second resonant spring 400B have the same specification and shape. A gap dimension L400A between the elastic-body support portion 450A1 of the elastic-body support member 450 and the bottom surface 1820 which support the first resonant spring 400A and a gap dimension L400B between the elastic-body support portion 450A2 of the elastic-body support member 450 and the end-portion member 4 which support the second resonant spring 400B may be the same dimension. Therefore, it is possible to achieve a resonance mechanism having favorable resonance characteristics in a simple structure, and it is possible to realize continuous reciprocating motion of the piston 1100.

FIG. 4C shows guide support portions 1023 attached to the end-portion member 4 and guides 1014 which are assembled to the guide support portions 1023 and on which the slider 2 slides.

The guides 1014 are configured such that groove portions 1014a are fitted to the end portions of the plate-shaped slider 2 in the left-right direction, and can move relative to the slider 2. The guide 1014 has a shape capable of moving relative to the slider 2 only in a reciprocating direction between the guide 1014 and the guide support portion 1023.

The guide support portions 1023 are attached to the end-portion member 4 by insertion portions of bolts inserted to the end-portion member 4 in the forward-backward direction. The movement of the guides 1014 is restrained due to friction caused by contact with the guide support portions 1023 come in contact with each other.

FIG. 4D is a schematic diagram illustrating an arrangement of the resonant springs of the linear motor including the resonant springs according to Embodiment 1. FIG. 4D is a diagram viewed in the same direction as FIG. 4C. A reference sign 400Aa denotes a position (phase) of one end portion of the resonant spring 400A in the circumferential direction, and a reference sign 400Ba denotes a position (phase) of one end portion of the resonant spring 400B in the circumferential direction.

When the first resonant spring 400A and the second resonant spring 400B are projected on the plate surfaces of the slider 2 in the direction perpendicular to the plate surfaces of the slider 2 as represented by dotted lines, the first resonant spring 400A and the second resonant spring 400B are configured such that the projection views of the second resonant spring 400B are present within the plate surfaces of the slider 2. Therefore, it is possible to compactly arrange the first resonant spring 400A and the second resonant spring 400B, and it is possible to reduce a dimension of the compressor (particularly, a driving motor portion thereof) in a direction perpendicular to the central axis 2A.

In the present embodiment, the two first resonant springs 400A which "further contract" at top dead centers of the piston 1100 and the two second resonant springs 400B which "further contract" in at bottom dead centers are diagonally arranged (so as to be symmetric with respect to the center (projection point of the central axis 2A) 2A). The diagonally arranged two first resonant springs 400A of the resonant springs 400 are in the same expansion and contraction state, and the diagonally arranged two second resonant springs 400B are in the same expansion and contraction state. Therefore, it is possible to restrain a moment from being applied to the elastic-body support member 450.

The phases (angles of one ends 400Aa and 400Ba of the resonant springs 400A and 400B in axial view) of the resonant springs 400A and 400B are different from each other by 180 degrees between the diagonally arranged resonant springs. That is, the phases (angles of the one ends 400Aa of the two resonant springs 400A in axial view) of the diagonally arranged two first resonant springs 400A are different from each other by 180 degrees. The phases (angles of the one ends 400Ba of the two resonant springs 400B in axial view) of the diagonally arranged two second resonant springs 400B are different from each other by 180 degrees.

The vibration directions of the resonant springs 400A and 400B as the coil springs are not necessarily parallel to the axial directions, and are misaligned according to a phase relationship between the end portions thereof. The misaligned phases in the vibration directions are different from each other by approximately 180° by diagonally providing the two first resonant springs 400A in the same expansion and contraction state and diagonally providing the two second resonant springs 400B in the same expansion and contraction state, and thus, the lateral vibration (vibration in the direction perpendicular to the reciprocating direction of the slider) of the slider 2 connected to the resonant springs 400A and 400B is canceled. Accordingly, it is possible to reduce the lateral vibration.

The phases of the first resonant spring 400A and the second resonant spring 400B adjacent to each other are different from each other by 90°. The phases of the first resonant spring 400A and the second resonant spring 400B adjacent to each other are different from each other by 90°, and thus, the directions of the lateral vibrations thereof are perpendicular to each other. Therefore, it is possible to restrain the lateral vibrations from being amplified, and thus, it is possible to expect reductions in the lateral vibrations.

Figure 4E:
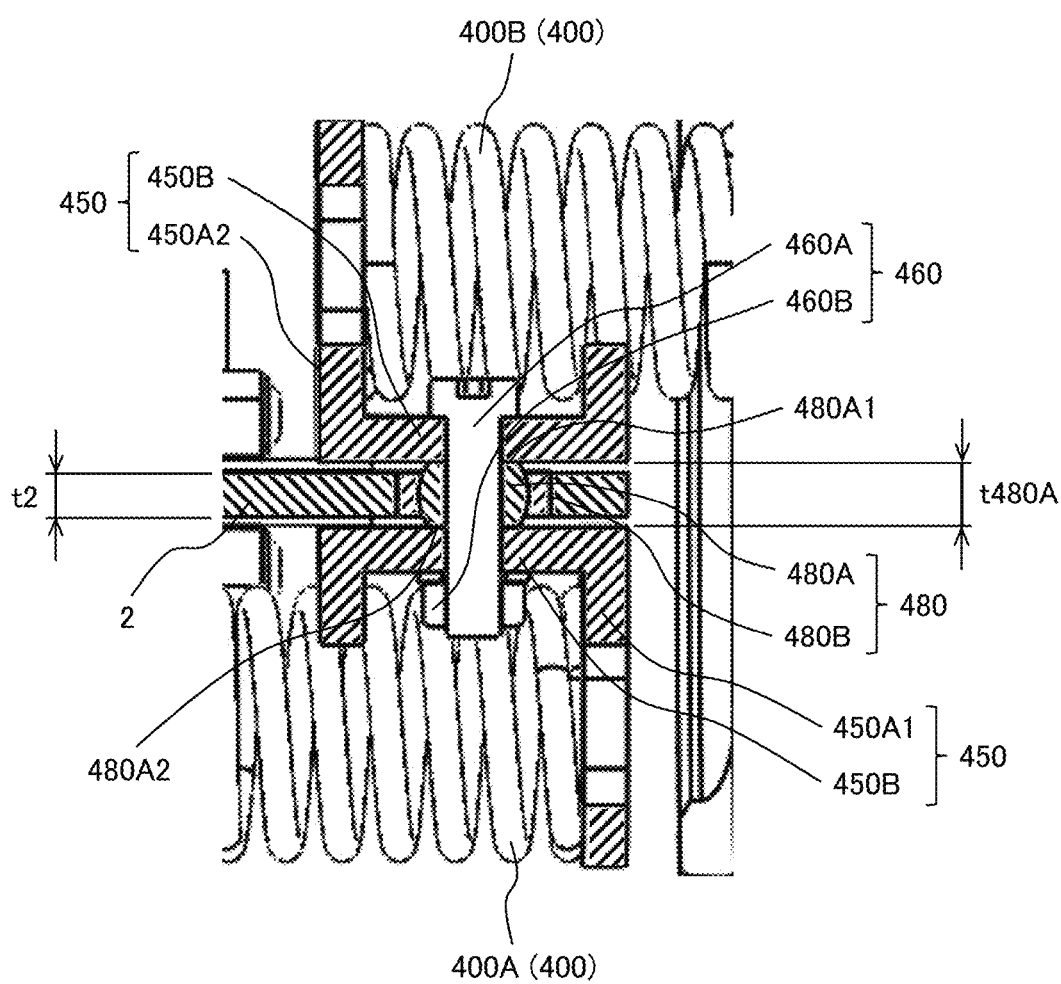
FIG. 4E is a cross-sectional view illustrating portions at which the elastic-body support portions of the linear motor including the resonant springs according to Embodiment 1 are attached to the slider.

FIG. 4E is a cross-sectional view illustrating portions at which the elastic-body support portions of the linear motor including the resonant springs according to Embodiment 1 are attached to the slider. FIG. 4E is a schematic diagram illustrating an arrangement of the two elastic-body support members 450 and the spherical bearing 480.

The two elastic-body support members 450 are fastened by a bolt 460A and a nut 460B with the spherical shaft 480A of the spherical bearing 480 interposed therebetween so as not to rotate each other, and the spherical shaft 480A is fitted to the housing 480B of the spherical bearing 480 fixed to the slider 2. The fixing portions 450B of the two elastic-body support members 450 are supported with a gap between the slider 2 and the fixing portions.

Thus, the spherical shaft 480A includes flat surface portions (abutment surfaces) 480A1 and 480A2 on which the elastic-body support members 450 abut at both the end portions in the up-down direction. A space (space dimension) t480 between the flat surface portion 480A1 and the flat surface portion 480A2 in the up-down direction is greater than a thickness (thickness dimension) t2 of the slider 2. A space (space dimension) t480 between the flat surface portion 480A1 and the flat surface portion 480A2 is a dimension of the spherical shaft 480A through which the nut 460B penetrates in the axial direction, and is equal to a space (space dimension) between the fixing portions 450B of the two elastic-body support members 450.

Therefore, the elastic-body support members 450 freely move relative to the slider 2 in a range of the space due to the movement of the spherical bearing 480. Thus, when a vibration load of the plurality of resonant springs 400 acts, the elastic-body support members 450 move according to the vibration load, the resonant springs 400 being arranged in a direction in which the lateral vibrations are canceled each other, and the vibration load being caused by the phase misalignment during the expansion and contraction in the lateral direction. Thus, a moment caused by the vibration load of the resonant springs 400 in the lateral direction is prevented or restrained from acting on the slider 2. Due to this effect, the slider 2 can reciprocate in the forward-backward direction without tilting the posture thereof in the up-down and left-right directions even when the lateral vibrations occur in the resonant springs 400.

Embodiment 2

Figure 5:
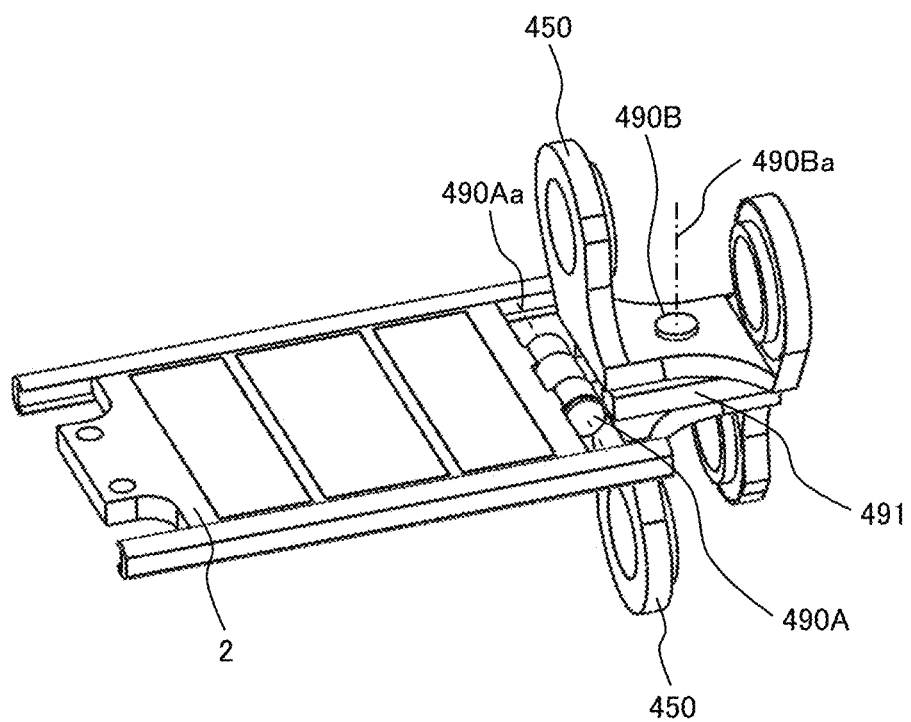
FIG. 5 is a perspective view of a slider of a linear motor according to Embodiment 2.

A configuration of the present embodiment can be the same as the configuration of Embodiment 1 except for the following points. FIG. 5 is a perspective view of the slider 2 of the linear motor according to the present embodiment.

The two elastic-body support members 450 are supported by the slider 2 by using perpendicularly arranged two rotary bearings 490A and 490B. The rotary bearing 490A is a bearing capable of rotating around a rotation axis 490Aa along the left-right direction, and supports the two elastic-body support members 450 in a rotatable manner in the up-down direction. The rotary bearing 490B is a bearing capable of rotating around a rotation axis 490Ba along the up-down direction, and supports the two elastic-body support members 450 in a rotatable manner in the up-down direction.

In the present embodiment, the rotary bearing 490A is arranged at a rear end portion of the magnetic-pole support portion 200 of the slider 2, and is connected to a support portion 491 of the elastic-body support member 450 on a side of the rotary bearing 490A on which the rotary bearing rotates with respect to the slider 2. Meanwhile, the rotary bearing 490B is assembled to the support portion 491, and the two rotary bearings 490A and 490B having the rotation axes 490Aa and 490Ba perpendicular to each other are arranged in different positions in the forward-backward direction.

The two elastic-body support members 450 are fastened by a bolt and a nut each including a detent in positions of the fixing portions 450B which are coaxial with the rotation axis 490Ba of the rotary bearing 490B so as not to rotate relative to each other. Accordingly, the elastic-body support members 450 freely move relative to the slider 2 due to the movement of the two perpendicular rotary bearings 490A and 490B. Thus, when the vibration load of the plurality of resonant springs 400 acts, the elastic-body support members 450 rotate according to the vibration load, the vibration load caused by the phase misalignment during the expansion and contraction in the lateral direction, the resonant springs 400 being arranged in a direction in which the lateral vibrations are canceled each other, and the vibration load being caused by the phase misalignment during the expansion and contraction in the lateral direction. Thus, a moment caused by the vibration load of the resonant springs 400 in the lateral direction is prevented or restrained from acting on the slider 2. Due to this effect, the slider 2 can reciprocate in the forward-backward direction without tilting the posture thereof in the up-down direction and the left-right direction even when the lateral vibrations occur in the resonant springs 400.

Embodiment 3

Figure 6A:
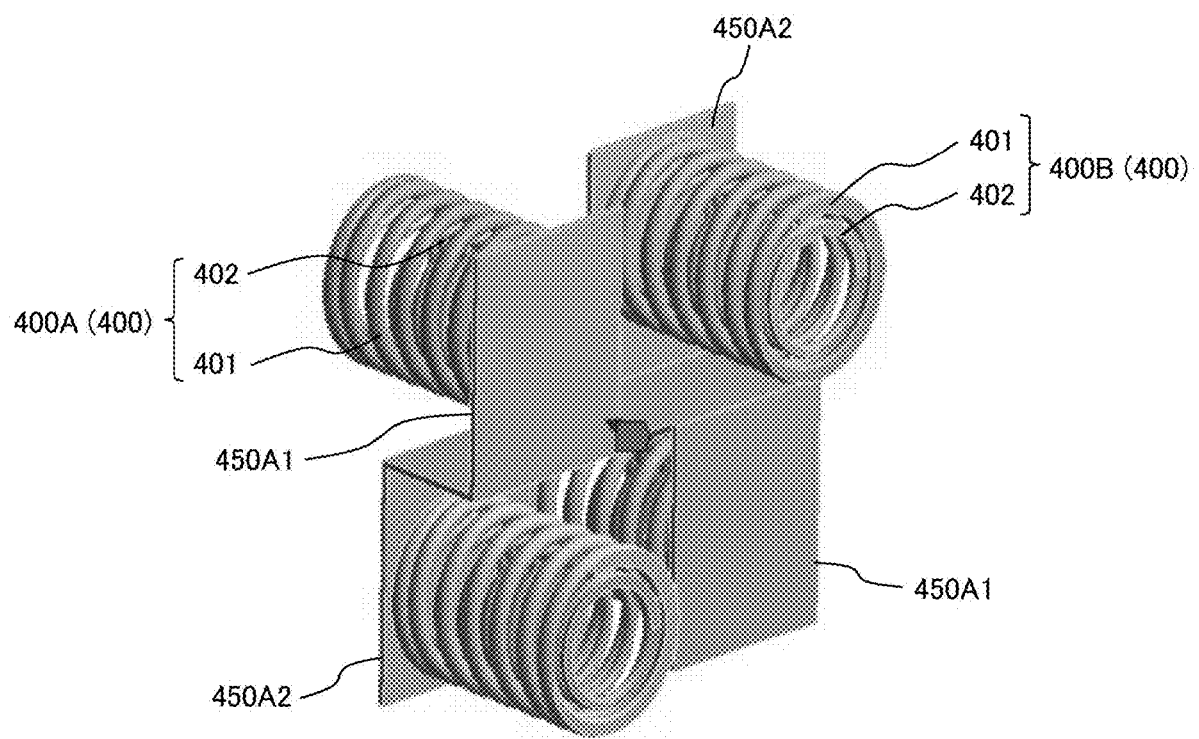
FIG. 6A is a perspective view illustrating an attachment state of resonant springs of a linear motor according to Embodiment 3.
Figure 6B:
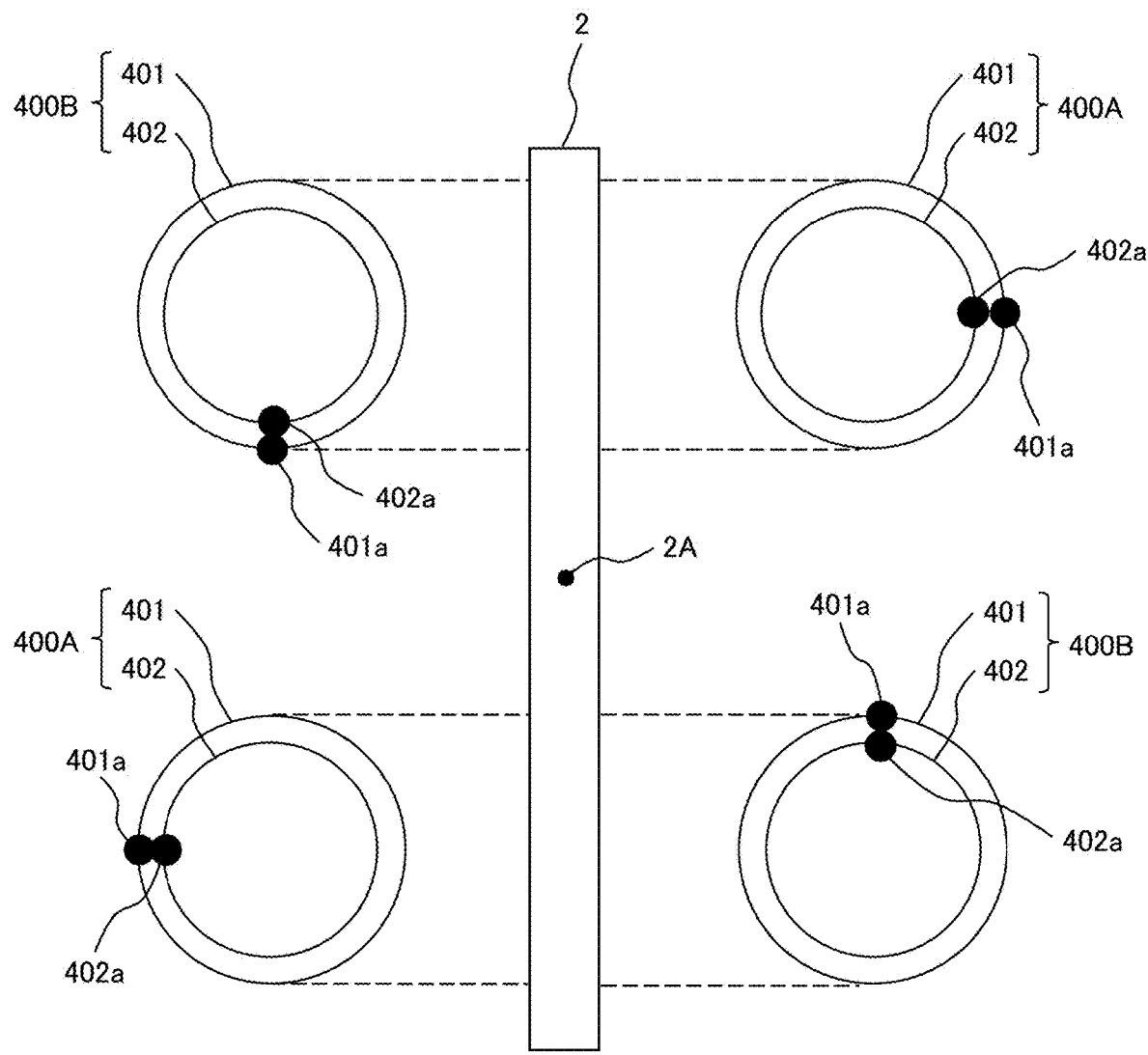
FIG. 6B is a schematic diagram illustrating an arrangement of the resonant springs of the linear motor according to Embodiment 3.

A configuration of the present embodiment can be the same as the configurations of Embodiments 1 and 2 except for the following points. FIG. 6A is a perspective view illustrating an arrangement of resonant springs 400 supported by the slider 2 of the linear motor according to the present embodiment. FIG. 6B is a schematic diagram illustrating an arrangement of the resonant springs 400 of the linear motor according to the present embodiment.

Each of the first resonant springs 400A and the second resonant springs 400B is configured by combining two coil springs 401 and 402. The two coil springs 401 and 402 are coil springs of which winding directions are different from each other. For example, when the coil spring 401 is a right-handed spring, the coil spring 402 is a left-handed spring. The coil spring 402 is arranged inside the coil spring 401. Thus, an outer diameter of the coil spring 402 is smaller than an inner diameter of the coil spring 401. The winding numbers of the coil springs are adjusted such that spring lengths during the installation of the springs are equal to each other. In order for orientations of the lateral vibrations caused by the expansion and contraction of the coil springs to coincide with each other, positions (phases) 401a and 402a of spring end portions of the two coil springs 401 and 402 constituting one resonant spring 400A or 400B in the circumferential direction need to be substantially equal to each other, as illustrated in FIG. 6B. In the diagonally arranged two first resonant springs 400A, the positions (phases) 401a and 402a of the spring end portions in the circumferential direction are different from each other by 180 degrees. Similarly, in the diagonally arranged two second resonant springs 400B, the positions (phases) 401a and 402a of the spring end portions in the circumferential direction are different from each other by 180 degrees.

A relationship between the positions (phases) 401a and 402a of the spring end portions in the circumferential direction between the two first resonant springs 400A and the two second resonant springs 400B is the same as FIG. 4D, and is different from FIG. 4D in that each of one first resonant spring 400A and one second resonant spring 400B is configured by combining the two coil springs 401 and 402.

FIG. 6B illustrates one end portions of the coil springs 401 and 402, and the positions (phases) of the other end portions of the coil springs 401 and 402 in the circumferential direction are the same as the positions (phases) of the one end portions illustrated in FIG. 6B.

Similarly to Embodiments 1 and 2, in the configuration of the present embodiment, a set of resonant springs 400 each including the two coil springs 401 and 402 includes the first resonant spring 400A supported by the elastic-body support portion 450A1 and the end-portion member 4 and the second resonant spring 400B supported by the elastic-body support member 450A2 and the bottom surface 1820 of the casing 1800. Two sets of the first resonant springs 400A and the second resonant springs 400B are respectively arranged on both sides of the slider 2. Thus, a total of eight coil springs are used in the present embodiment.

Eight coil springs are respectively provided in the contraction states, and are fixed to the elastic-body support portions 450A1 and 450A2 and the end-portion member 4 or the bottom surface 1820 of the casing 1800. Since one set of resonant springs 400 including the two first resonant springs 400A or the two second resonant springs 400B is attached in positions different from each other by approximately 180 degrees, the lateral vibrations caused by the expansion and contraction of the coil springs constantly occur in orientations opposite to each other. Accordingly, the lateral vibrations can be substantially canceled within one set of the resonant springs 400A and one set of the resonant springs 400B, and thus, it is possible to restrain the moment from being applied to the elastic-body support members 450. In this case, since the two coils 401 and 402 cannot have the same shape, the lateral vibration loads are not equal to each other. Thus, the lateral vibration loads cannot be completely canceled within one set of resonant springs 400. Accordingly, similarly to Embodiments 1 and 2, the positions of the spring end portions of the diagonally arranged first resonant springs 400A or second resonant springs 400B are different from each other by 180 degrees, and thus, it is possible to restrain the moment caused by the lateral vibration loads.

In this case, since the eight coil springs are used but the lateral vibrations can be restrained within the resonant springs, it is possible to restrain the moment from being applied to the elastic-body support members 450 even though the spherical bearing 480 or the perpendicularly arranged two rotary bearings 490A and 490B which are used in Embodiments 1 and 2 are not used. Accordingly, the kinds of components are reduced, and thus, it is possible to contribute to a reduction in manufacturing costs. When the spherical bearing 480 or the perpendicularly arranged two rotary bearings 490A and 490B are used, it is possible to further restrain the moment. Therefore, it is possible to reduce friction caused by which the guides 1014 and the guide support portions 1023 come in contact with each other, and it is possible to provide a high-efficiency motor.

Embodiment 4

Figure 7A:
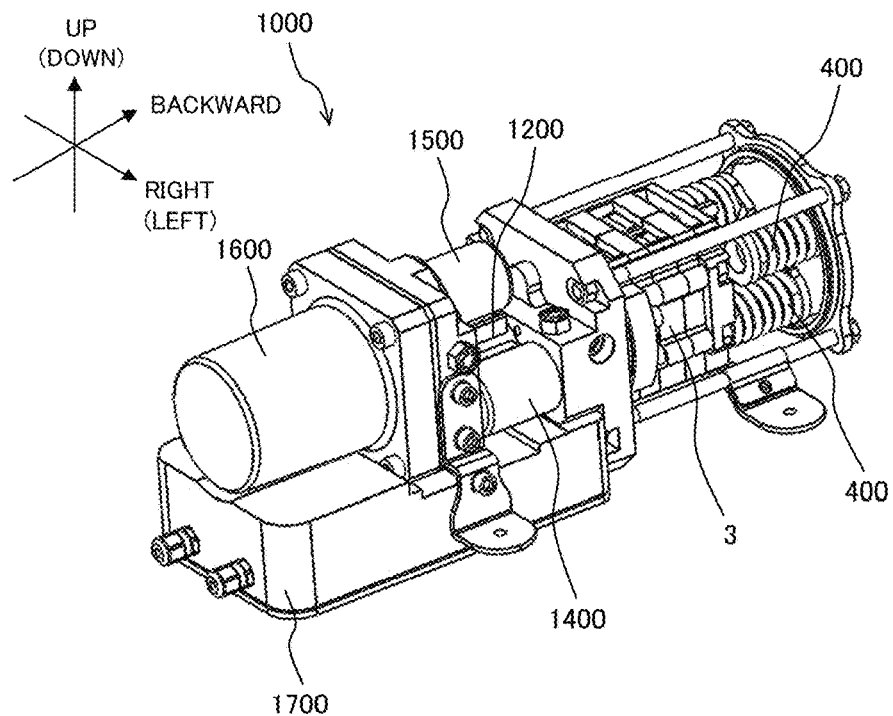
FIG. 7A is a perspective view illustrating an embodiment (Embodiment 4) of a compressor using the linear motor according to any one of Embodiments 1 to 3.
Figure 7B:
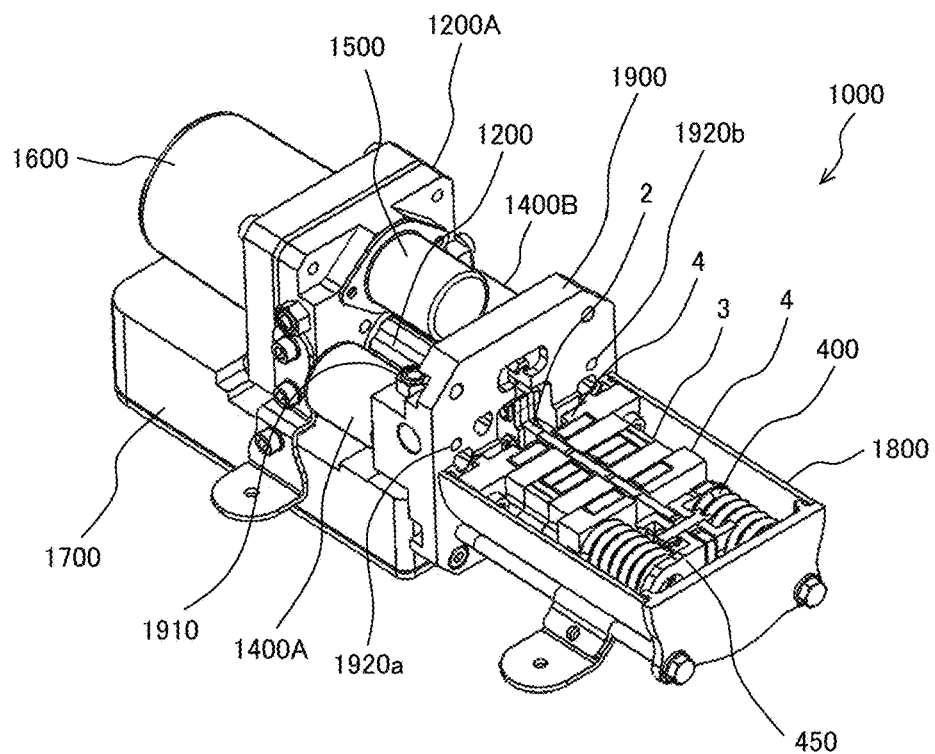
FIG. 7B is a cross-sectional view of major parts illustrating the embodiment (Embodiment 4) of the compressor using the linear motor according to any one of Embodiments 1 to 3.

FIG. 7A is a perspective view of a compressor 1000 including the linear motor according to Embodiments 1 to 3. FIG. 7B is a cross-sectional view of major parts of the compressor 1000. The same components as those of Embodiments 1 to 3 will be the same reference signs, and the description thereof will be omitted.

The compressor 1000 according to the present embodiment can be used as a gas compressor which compresses air or refrigerant. The compressor includes the resonant springs 400 and the elastic-body support members 450 which are provided on one side of the armature 3 in the reciprocating direction of the slider 2, the piston 1100 provided on the other side of the armature 3, a cylinder 1200, solenoid valves 1400A and 1400B, an exhaust valve 1500, a dryer 1600, and an inverter 1700.

In the compressor 1000 according to the present embodiment, a driving motor of the piston 1100 includes the linear motor, and the slider 2 has a flat plate shape (flat plate shape). The slider 2 further protrudes backwards from the rear end portion of the end-portion member 4.

The casing 1800 that accommodates the armature 3, the resonant springs 400, and the elastic-body support members 450 is attached to the cylinder 1200. Although it has been described in the present embodiment that the end-portion member 4 is used as a front surface of the casing 1800, a member constituting the front surface of the casing 1800 may be provided on the front side of the end-portion member 4. That is, a front-surface member may be provided separately from the end-portion member 4 instead of using the end-portion member 4 as the front-surface member of the casing 1800.

The casing 1800 is configured such that a tubular side surface (side-surface member) 1810 and the rear surface (rear-surface member or bottom-surface member) 1820 are provided as separate members, and the bottom surface 1820 is fixed to the cylinder 1200 through a base plate 1900 by an insertion portion 1830 extending forwards and backwards. Accordingly, the side surface 1810 is clamped between the rear surface 1820 and the cylinder 1200.

An electrode 465 protrudes forwards from the casing 1800. The electrode 465 has an elongated rod shape, and a lead-out end portion of the winding 5 is electrically connected to an end portion of the electrode 465. The other end portion of the electrode 465 penetrates through a through-hole (not illustrated) formed in the base plate 1900, is inserted into the inverter 1700, and is electrically connected to an internal inverter circuit.

A suction and discharge port 1910 of the gas is formed in the base plate 1900. The two solenoid valves 1400A and 1400B are attached to the base plate 1900, and two through-holes (gas passages) 1920a and 1920b through which gas flows are formed so as to correspond to the solenoid valves 1400A and 1400B. The solenoid valves 1400A and 1400B are three-way valves, and constitute a suction and discharge valve of the gas. When one solenoid valve 1400A is in a suction state, the other solenoid valve 1400B is in a discharge state. The one solenoid valve 1400A causes the gas sucked from the suction and discharge port 1910 in the suction state to flow into the casing 1800 through the through-hole 1920a. At this time, the other solenoid valve 1400B is in the discharge state, and blocks the flow of the gas through the through-hole 1920b.

The gas flowed into the casing 1800 through the solenoid valve 1400A flows in gaps between the slider 2, the end-portion members 4, and the base plate 1900, flows into the cylinder 1200, and flows to the dryer 1600 through the cylinder 1200. The gas is discharged from the dryer 1600 through the other solenoid valve 1400B. When the suction and discharge states of the solenoid valve 1400A and the solenoid valve 1400B are switched, the gas flows along a reverse path of the aforementioned path. The flowed gas is compressed in the cylinder 1200 if necessary. A suction and discharge port (not illustrated) is formed in a position corresponding to the suction and discharge port 1910, on a side on which the through-hole 1920b of the base plate 1900 is formed.

The dryer 1600 is attached to a cylinder head 1200A of the cylinder 1200 in a state in which the dryer can be communicatively connected to the inside of the cylinder 1200.

In the compressor 1000 according to the present embodiment, it is possible to compactly arrange the first resonant spring 400A and the second resonant spring 400B on one side of the slider 2 having the flat plate shape, and it is possible to reduce the dimension of the compressor (particularly, the driving motor portion of the compressor) in the direction perpendicular to the central axis 2A. Meanwhile, in the present embodiment, a dimension in the direction along the central axis 2A (the movement direction of the slider 2) tends to increase by using the linear motor. In the present embodiment, since the first resonant spring 400A and the second resonant spring 400B are arranged on one side of the slider 2 having the flat plate shape and the two resonant springs 400 are provided in an overlapped range in the direction along the central axis 2A, it is possible to restrain the dimension in the direction along the central axis 2A from increasing. Accordingly, it is possible to achieve the compact compressor using the linear motor in the present embodiment.

Embodiment 5

Figure 8:
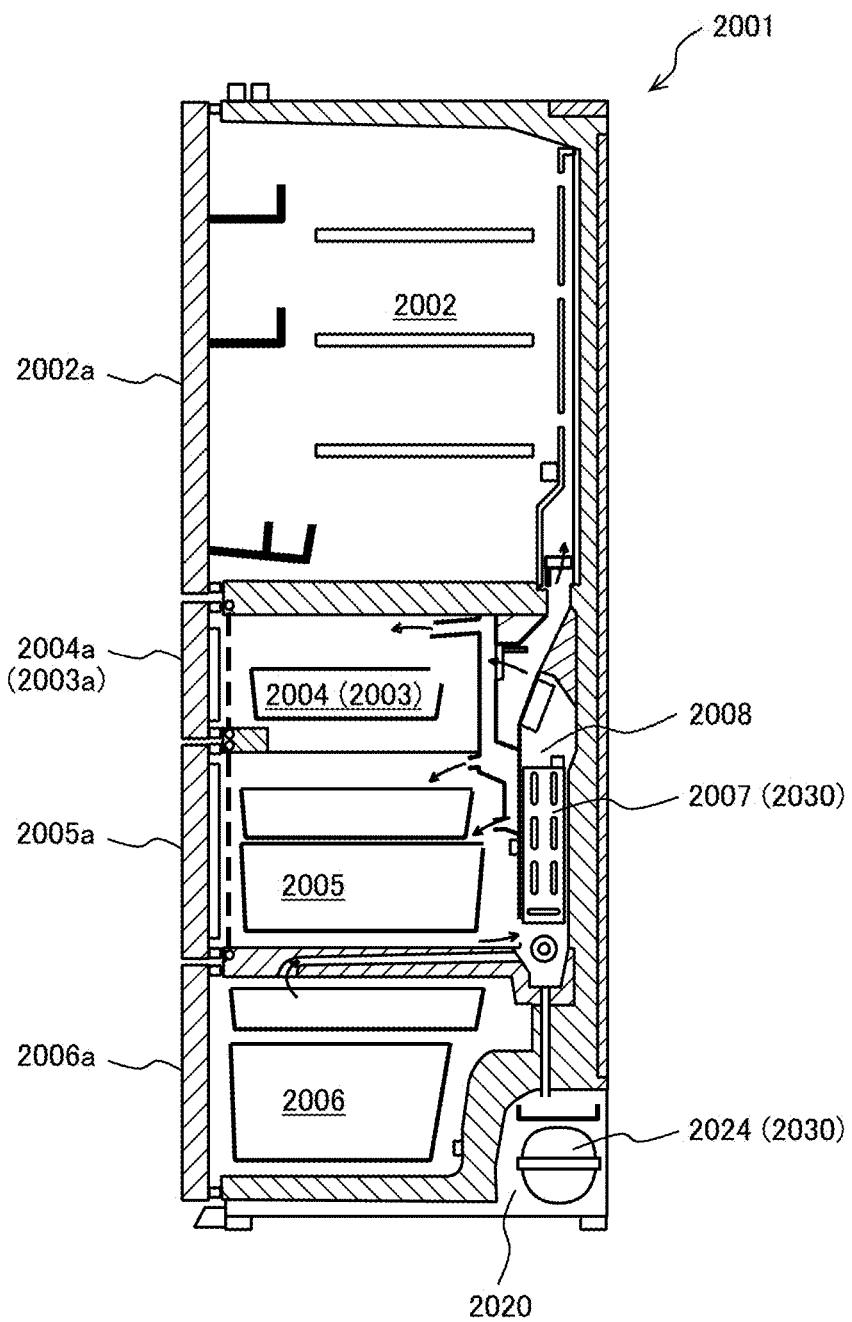
FIG. 8 is a configuration diagram of a refrigerator according to Embodiment 5.

FIG. 8 is a diagram illustrating a configuration of a refrigerator according to Embodiment 5. The same components as those of Embodiments 1 to 4 will be assigned the same reference signs, and the description thereof will be omitted.

A refrigerator 2001 includes a cold room double door 2002a which is divided into a left door and a right door on a front surface of a cold room 2002, and includes an ice-making room door 2003a, an upper freezer room door 2004a, a lower freezer room door 2005a, and a vegetable room door 2006a as drawer types which are respectively on front surfaces of an ice-making room 2003, an upper freezer room 2004, a lower freezer room 2005, and a vegetable room 2006.

A machine room 2020 is provided on a rear surface of the vegetable room 2006, and a compressor 2024 is arranged in the machine room 2020. An evaporator room 2008 is provided on rear surfaces of the ice-making room 2003, the upper freezer room 2004, and the lower freezer room 2005, and an evaporator 2007 is provided in the evaporator room 2008. In the refrigerator 2001, a radiator, and a capillary tube and a three-way valve which are pressure reduction means (not illustrated) in addition to the compressor 2024 and the evaporator 2007 are connected to each other at a refrigerant pipe, and thus, a refrigeration cycle 2030 is constituted by these devices.

In the present embodiment, the linear motor 100 according to any one of the aforementioned embodiments is adopted to the compressor 2024 constituting the refrigeration cycle 2030 of the refrigerator 2001. For example, the compressor 1000 according to Embodiment 4 may be adopted as the compressor 2024. Accordingly, it is possible to restrain the amount of used hard magnetic materials, and it is possible to restrain an increase in size of the compressor 2024 constituting the refrigeration cycle 2030. It is possible to secure a large space for use in the cold room and the freezer room, and it is possible to provide a large-capacity refrigerator without increasing an external dimension.

Embodiment 6

Figure 9:
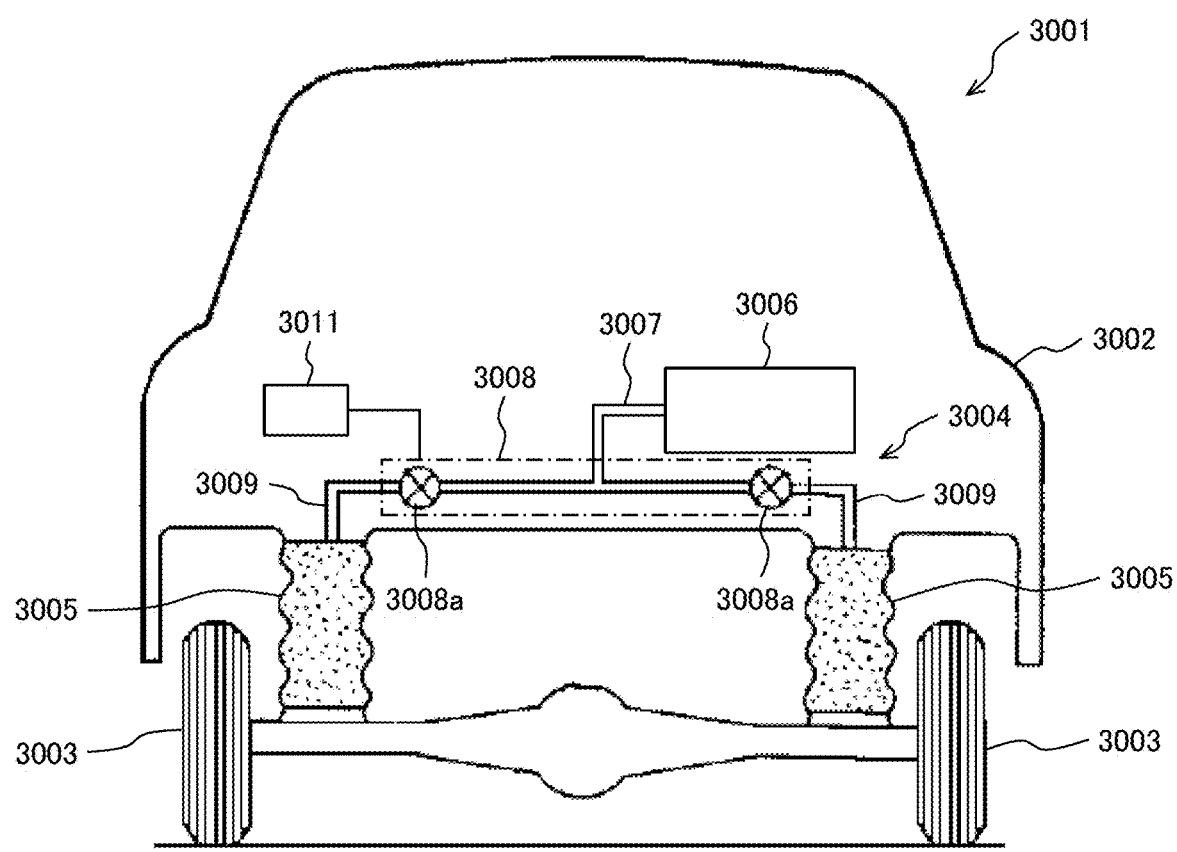
FIG. 9 is a configuration diagram of an air suspension for a vehicle according to Embodiment 6.

FIG. 9 is a diagram illustrating a configuration of an air suspension for a vehicle according to Embodiment 6. The same components as those of Embodiments 1 to 5 will be assigned the same reference signs, and the description thereof will be omitted.

In the present embodiment, an example in which the air suspension for a vehicle is mounted on a vehicle such as a four-wheeled vehicle will be described.

A vehicle body 3002 constitutes a body of a vehicle 3001. A total of four vehicle wheels 3003 of left and right front wheels and left and right rear wheels are provided under the vehicle body 3002. The air suspension 3004 includes four air springs 3005 provided between the vehicle body 3002 and the vehicle wheels 3003, an air compressor 3006, a valve unit 3008, and a controller 3011. The air suspension 3004 adjusts a vehicle height by supplying compressed air to the air springs 3005 from the air compressor 3006 or exhausting the compressed air from the air springs 3005.

In the present embodiment, the linear motor 100 according to any one of the aforementioned embodiments is adopted as the driving motor of the air compressor 3006. For example, the compressor 1000 according to Embodiment 4 may be adopted as the air compressor 3006. The air compressor 3006 is connected to the valve unit 3008 through a supply and exhaust pipeline (pipe) 3007. Four supply and exhaust valves 3008a as solenoid valves which are respectively provided so as to correspond to the vehicle wheels 3003 are provided in the valve unit 3008. Branch pipelines (pipes) 3009 are provided between the valve unit 3008 and the air springs 3005 of the vehicle wheels 3003. The air springs 3005 are connected to the air compressor 3006 through the branch pipelines 3009, the valves 3008a, and the supply and exhaust pipeline 3007. The valve unit 3008 supplies or exhausts the compressed air to or from the air springs 3005 by opening or closing the supply and exhaust valves 3008a in response to a signal from the controller 3011, and adjusts the vehicle height. The valve unit 3008 supplies or exhausts the compressed air to or from the air springs 3005 by opening or closing the supply and exhaust valves 3008a in response to a signal from the controller 3011, and adjusts the vehicle height.

In the present embodiment, it is possible to restrain the amount of hard magnetic materials used in the air compressor 3006, and it is possible to restrain an increase in size of the air compressor 3006 constituting the air suspension 3004. It is possible to reduce a space in which the air compressor 3006 is mounted on the vehicle 3001, and it is possible to improve the degree of freedom of the arrangement of the air compressor 3006.

[Other Aspects]

Although the magnet moving type in which the armature 3 is fixed and the slider 2 (field magnet) moves has been described in the aforementioned embodiments, a coil moving type in which the slider 2 (field magnet) is fixed and the armature 3 moves may be used.

The present invention is applicable to various devices in which the stator 1 and the slider 2 move relative to each other in addition to the motor (linear motor) and the compressor. For example, the same effects are also obtained when the present invention is used in a generator, a compressor, an electromagnetic suspension, a positioning device, and the like.

The present invention is not limited to the aforementioned embodiments, and includes various modification examples. For example, the aforementioned embodiments are described in detail in order to facilitate easy understanding of the present invention, and are not limited to necessarily include all the components. Some of the components of a certain embodiment can be substituted into the components of another embodiment, and the components of another embodiment can be added to the component of a certain embodiment. Additions, the components of another embodiment can be added, removed, and substituted to, from, and into some of the components of the aforementioned embodiments.

REFERENCE SIGNS LIST 1 stator
2 slider
3 armature
5 winding
100 linear motor
200, 200a magnetic-pole support portion
210 permanent magnet
300 core
301 magnetic pole tooth
302 arm portion
4 end-portion member
400 resonant spring
400A first resonant spring
400Aa position (phase) of one end portion of resonant spring 400A in circumferential direction
400B second resonant spring
400Ba position (phase) of one end portion of resonant spring 400B in circumferential direction
401, 402 coil spring
401a, 402a positions (phases) of spring end portions of coil springs 401 and 402 in circumferential direction
450 elastic-body support member
450A1, 450A2 elastic-body support portion of elastic-body support member 450
450B fixing portion of elastic-body support member 450
480 spherical bearing
490A, 490B rotary bearing
491 support portion of elastic-body support member 450
1000 compressor
2001 refrigerator
2024 compressor of refrigerator 2001
3001 vehicle
3004 air suspension
3006 air compressor of air suspension 3004

The invention claimed is:

1. A linear motor including a slider driven in a first direction, resonant springs configured to vibrate in the first direction, and a permanent magnet which is provided at the slider and is magnetized in a second direction perpendicular to the first direction, the linear motor comprising:
a bearing configured to move against both of a force in the second direction and a force in a third direction perpendicular to the first direction and the second direction, the first direction being a forward-backward direction, the second direction being an up-down direction, and the third direction being a left-right direction; and
an elastic-body support member that connects at least one of the resonant springs and the bearing to each other,
wherein the slider is configured to reciprocate in the first direction,
magnetic poles and windings provided on both sides of the slider are provided in the second direction, and
the resonant springs are provided on both sides of the bearing in the second direction.

2. The linear motor according to claim 1,
wherein the at least one of resonant springs is held by the elastic-body support member in a contraction state, and is held by the elastic-body support member so as to be detachable from the elastic-body support member through cancelation of the contraction state using the elastic-body support member.

3. The linear motor according to claim 1,
wherein the bearing includes a first bearing which is movable by the force in the second direction and a second bearing which is movable by the force in the third direction.

4. A compressor comprising:
a cylinder;
a piston that reciprocates inside the cylinder; and
the linear motor according to claim 1, as a driving motor that drives the piston,
wherein the bearing and the at least one resonant spring are arranged on one side of the slider, and the piston is arranged on another side of the slider.

5. A linear motor including a slider driven in a first direction, resonant springs configured to vibrate in the first direction, and a permanent magnet which is provided at the slider and is magnetized in a second direction perpendicular to the first direction, the linear motor comprising:
a bearing configured to move against both of a force in the second direction and a force in a third direction perpendicular to the first direction and the second direction, the first direction being a forward-backward direction, the second direction being an up-down direction, and the third direction being a left-right direction; and
an elastic-body support member that connects at least one of the resonant springs and the bearing to each other,
wherein a part or all of the resonant springs are coil springs,
the coil springs include a first coil spring and a second coil spring which are wound in two directions different from each other, and
the second coil spring is arranged on an inner circumferential side of the first coil spring.

* * * * *